Dec. 23, 1969 R. L. GATES 3,485,115
ROTARY POSITION MECHANISM
Filed June 7, 1968 2 Sheets-Sheet 1
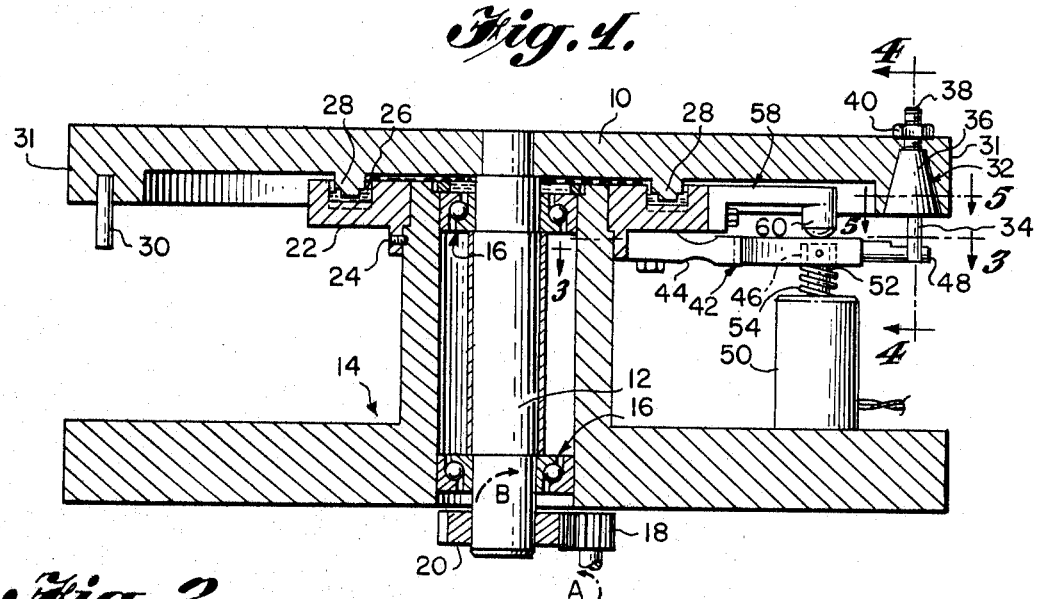
Fig. 1.
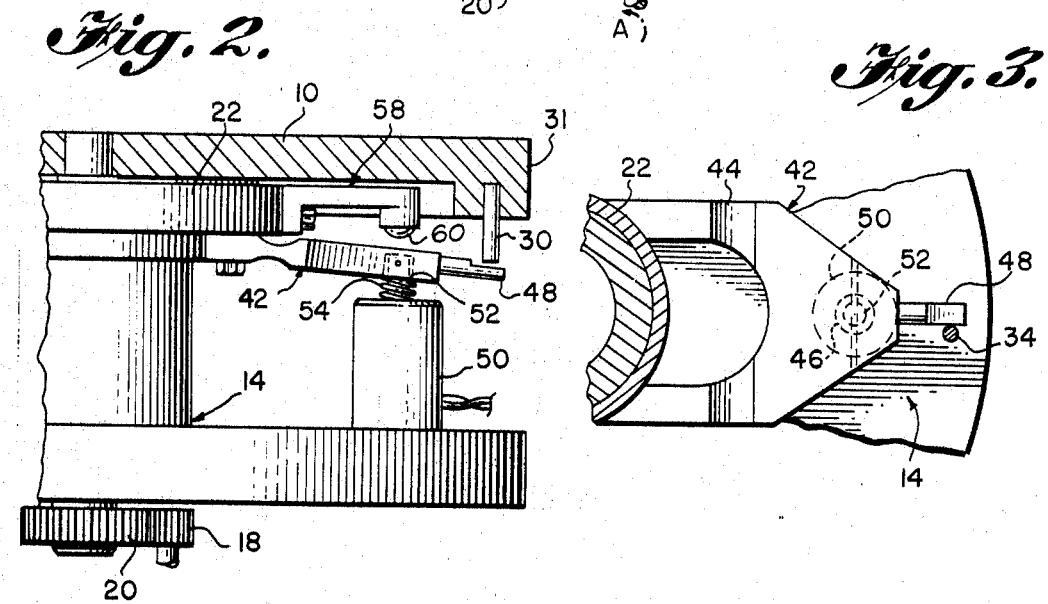
Fig. 2.
Fig. 3.
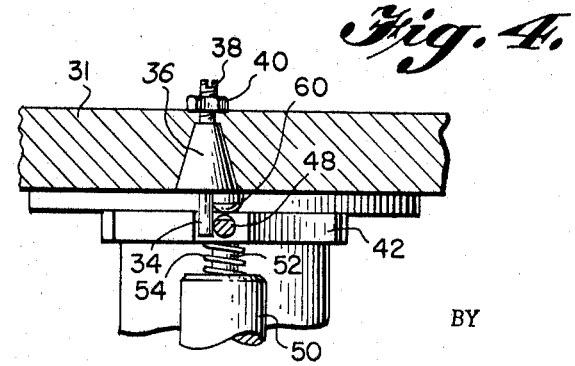
Fig. 4.
INVENTOR
ROBERT L. GATES
ATTORNEY Dec. 23, 1969    R. L. GATES    3,485,115
ROTARY POSITION MECHANISM
Filed June 7, 1968    2 Sheets-Sheet 2

INVENTOR
ROBERT L. GATES
BY
ATTORNEY

United States Patent Office 3,485,115
Patented Dec. 23, 1969

3,485,115
ROTARY POSITION MECHANISM
Robert L. Gates, Ridgewood, N.J., assignor to Singer-General Precision, Inc., Little Falls, N.J., a corporation of Delaware
Filed June 7, 1968, Ser. No. 735,371
Int. Cl. B23q 17/02
U.S. Cl. 74—815   12 Claims

ABSTRACT OF THE DISCLOSURE

A rotary position mechanism in which a rotating member is provided with projection means which is engaged by a stop assembly after a predetermined amount of rotation of the rotating member. Means are also provided to release the stop assembly to permit further rotation of the rotating member.

BACKGROUND OF THE INVENTION

This invention relates to a rotary position mechanism and, more particularly, to such a mechanism for indexing a rotating member in a unidirectional sense with a high degree of precision.

In many types of inertial guidance systems or sensing systems, it is necessary to rotate a turn-table or the like containing measuring or sensing instruments, for a predetermined angle in order to determine direction, or the like. For example, in U.S. Patent No. 3,320,819 there is disclosed a gyro indexing mechanism that may be employed with a conventional inertial guidance system for missiles and like vehicles, wherein it is necessary to establish an azimuth reference quickly and accurately prior to launching. In the patent, the indexing mechanism includes a turntable which is rotated and which positions a gyro unit about its precision axis for taking drift measurements before and after reversal of the input connection. It is apparent that the turntable rotation must be conrolled with a high degree of precision in order to insure accuracy of the reference.

In this connection, co-operating groove and latch means were provided for adjusting the angular position of the turntable. Also, it has been proposed to provide electrical or electro-optic sensors to provide error signals to an electronic position servo in order to obtain a highly accurate control of rotation of the turntable. However, these proposals involve a relatively high cost, in addition to being complex, bulky and somewhat unreliable.

SUMMARY OF THE INVENTION

It is therefore an object of the present invention to provide a mechanism for effecting a precision unidirectional indexing of a turntable, which is relatively low in cost and more compact and accurate.

Briefly summarized, the mechanism of the present invention includes a turntable which is rotatably supported for unidirectional rotation and which has a plurality of projecting members along with quick releasable stop means for the projecting members. At least one of the stop members includes a taper locked eccentric stop which permits the degree of turntable rotation to be adjusted within a few arc seconds.

BRIEF DESCRIPTION OF THE DRAWINGS

Reference is now made to the accompanying drawings for a better understanding of the nature and objects of the mechanism of the present invention, which drawings illustrate the best mode presently contemplated for carrying out the objects of the invention and its principles, and are not to be construed as restrictions or limitations on its scope. In the drawings:

FIG. 1 is a partial cross-sectional view showing the device of the present invention in its stopped position;

FIG. 2 is a partial cross-sectional view similar to FIG. 1, but showing the mechanism of the present invention immediately after release of the turntable for rotation;

FIG. 3 is a cross-sectional view taken along line 3—3 of FIG. 1;

FIG. 4 is a cross-sectional view taken along line 4—4 of FIG. 1;

DESCRIPTION OF THE PREFERRED EMBODIMENTS

Figure 5:
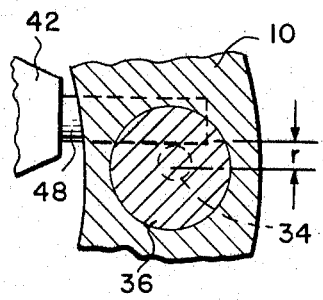
FIG. 5 is a cross-sectional view taken along line 5—5 of FIG. 1.

Referring specifically to FIG. 1, the reference number 10 refers to a turntable which has a central shaft 12 mounted for rotation in a flanged base member 14 by means of a plurality of bearings 16. A constantly energized, geared driving motor 18, rotating in the direction indicated by arrow A, is operatively connected to the shaft 12 to drive the turntable in the direction of arrow B.

A damping plate 22 is attached to the base member 14 by means of one or more set screws 24, and a groove 26 is formed in the damping plate to receive a projection 28 on the turntable 10 for damping the rotational movement of the latter, as will be discussed in detail later.

A cylindrical stop member 30, in the form of a rod or the like, projects from a flange 31 formed on the turntable, and an adjustable cylindrical stop assembly 32 extends through the flange 31 and is spaced a predetermined interval from the stop member 30, depending on the desired interval of uninterrupted rotation of the turntable such as, for example, 180°. The adjustable stop assembly 32 includes a cylindrical stop member 34, also in the form of a rod or the like, projecting from the flanges 31 and machined eccentric to a tapered section 36 which is adapted to be wedge locked into a corresponding tapered cavity formed in the flange 31, as shown. A threaded rod 38 is provided integral to the tapered section 36 and receives a nut 40 to further secure the adjustable stop assembly 32 with respect to the turntable 10. It is noted that, by rotating the threaded rod 38 and therefore the tapered section 36, the effective radius of the cylindrical stop member 34 can be varied as desired, due to its eccentricity with respect to the tapered section 36.

A stop assembly 42, also shown in plan view in FIG. 3, is bolted at one end to the bottom of the damping plate 22. The stop assembly has a reduced thickness, as shown at 44, to render it flexible in the vertical plane while rigid in the horizontal plane, and the free end portion 48 of the stop assembly is cylindrical and notched, as shown in FIG. 1.

A solenoid 50 is carried by the flanged portion of the base member 14 and has a movable plunger 52 which is attached within a hole 46 to the stop assembly 42 by a pin connector, as shown, or the like. A spring 54 extends around the plunger 52 and normally urges the stop assembly 42 in an upward direction. In order to maintain the stop assembly perfectly horizontal, an abutment assembly 58 may be provided which is bolted to the damping plate 22 and includes a projecting portion 60 adapted to engage the stop assembly 42 to limit the upward movement thereof.

Assuming that the turntable 10 is initially positioned as shown in FIG. 2 with the cylindrical stop member 30 in abutment with the cylindrical free end portion 48 of the stop assembly, and that it is desired to rotate the turntable through an arc of 180°, the mechanism is operated by actuating the solenoid 50 either manually or automatically. This causes the plunger 52 to move downwardly, as shown in FIG. 2 and flex the stop assembly 42 in the same direction so that the engagement between the stop member 30 and the free end portion 48 of the stop assembly is released, thus permitting the turntable to rotate in a direction B by means of the constantly energized driving motor 18. After a predetermined interval of turntable rotation, the plunger 52 is released by the solenoid, and the spring 54 causes the movable stop assembly 42 to flex upward into engagement with the projecting portion 60 on the abutment assembly 58 to maintain the stop assembly 42 in a precise horizontal direction.

Continued rotation of the turntable at a predetermined rate, such as six degrees per second, will result in the cylindrical stop member 34 coming into abutment with the free end portion 48 of the movable stop assembly 42 as shown in FIGS. 1, 3 and 4, after a rotation of 180°. It is noted that a point contact is made between the cylindrical stop member 34 and the cylindrical free end portion 48 of the stop assembly 42, and that the effective radius r of the cylindrical stop member 34, as shown in FIG. 5, can be adjusted by a rotation of the adjustable stop assembly 32 in the tapered cavity formed in the flange 31. This, plus the fact that the stop member 34 and the free end portion 48 may be of polished stainless steel, insures precise accuracy of the amount of rotation. Of course the above is also true in connection with the stop member 30, with the exception that the latter is not adjustable.

Figure 6:
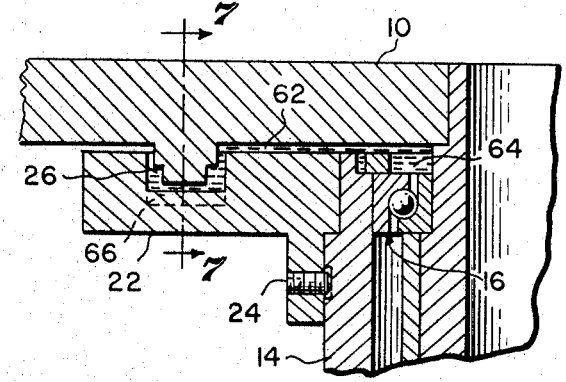
FIG. 6 is an enlarged broken view of FIG. 1.
Figure 7:
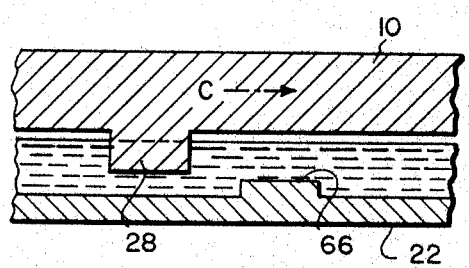
FIG. 7 is a cross-sectional view taken along line 7—7 of FIG. 6.
Figure 8:
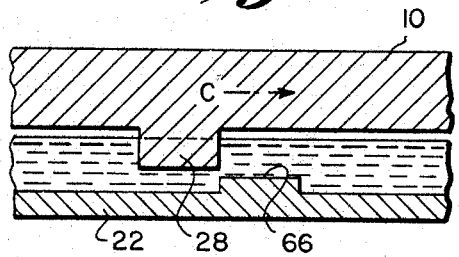
FIGS. 8–10 are views similar to FIG. 7 but showing the turntable and damping plate in various relative positions.
Figure 9:
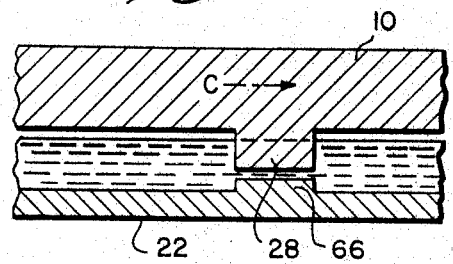
Figure 10:
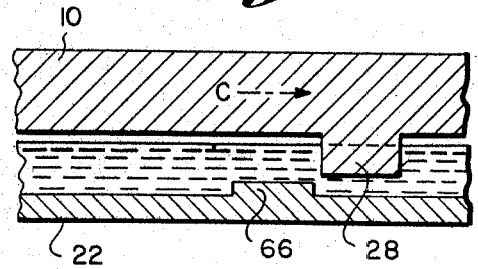

The uni-directional rotation of turntable 10 with respect to the base member 14 may be damped in a manner shown better with reference to FIG. 6. As shown, a viscous liquid is provided in the groove 26 of the damping plate 22 and extends in the spaces 62 and 64 formed between the turntable 10 and the damping plate 22, and between the turntable 10 and the upper bearing 16 as shown. The projection 28 of the turntable 10 may be notched, as shown in FIG. 6, and is adapted to cooperate with a damping projection 66 formed in the groove 26 of the damping plate 22, to provide increased damping at predetermined intervals such as at, or near, the stopped positions of the turntable. The relative positions of these cooperating damping projections 28 and 66 during rotation of the turntable are shown in FIGS. 7–10. Assuming the turntable is rotating in the direction indicated by the arrow C, the projections 28 and 66 can be located so that, during approach of the turntable to its stopped positions, the projections will align, as shown in FIG. 9, to increase damping at these positions in order to control slew rate and reduce the velocity impact at the stops It is thus seen that the mechanism of the present invention achieves a simple point contact of both of the cylindrical stop members 30 and 34 with the cylindrical free end portion 48 of the stop assembly 42, which insures very precise control of the amount of turntable rotation. Further, the mechanism is compact, simple to operate and reliable, largely due to the very low number of parts involved and elimination of electrical components. Also, in addition to being accurate in both short and long term repeatability of three arc seconds, the angle or rotation may be adjustable to two arc seconds. Finally, the cost of the mechanism of the present invention, when compared to the known electrical or electro-optic sensors is as much as ten times less, with the same amount of accuracy.

It is emphasized that several fundamental variations in the above may be made without departing from the basic inventive concept. For example, the turntable may be stopped at any intervals other than 180°, which of course would require the number of stop members, stop assemblies, and damping projections to be varied accordingly. Also, the center line of the cylindrical stop members could be perpendicular to the turntable axis, and any known means, such as a cam mechanism, could actuate the moving stop assembly, intead of the solenoid.

Of course, other variations of the specific construction and arrangement of the mechanism disclosed above can be made by those skilled in the art without departing from the invention as contained in the appended claims.

I claim:

1. In combination, a turntable, projecting means projecting from said turntable, support means for supporting said turntable for rotation, means for rotating said turntable so that said projecting means moves in a generally circular path, stop means carried by said support means and extending in said path to engage said projecting means to stop said turntable after a predetermined amount of turntable rotation, and means to move said stop means out of said path to permit further rotation of said turntable wherein said projecting means includes a tapered member adapted to be wedge locked to said turntable, and a rod member fixed with respect to said tapered member and projecting from said turntable.

2. The combination of claim 1 wherein said projecting means further includes a threaded member fixed with respect to said tapered member, and further comprising a nut adapted to engage said threaded member to further secure said projecting means to said turntable.

3. The combination of claim 1 wherein said rod member projects from one of the faces of said turntable.

4. The combination of claim 3 wherein said rod member is eccentric with respect to said tapered member so that the effective radius of said rod member can be varied, to vary the point of engagement of said rod member with said stop means.

5. The combination of claim 1 wherein said turntable is rotated in a unidirectional sense.

6. The combination of claim 1 wherein said driving means is a constantly energized driving motor.

7. The combination of claim 1 wherein said stop means is in the form of a flexure member adapted to flex to and from said path.

8. The combination of claim 1 wherein said means to move said stop means out of said path comprises a solenoid having a plunger operatively connected to said stop means.

9. The combination of claim 1 further comprising resilient means engaging said stop means for returning said stop means to a position in said path.

10. In combination, a turntable, projecting means projecting from said turntable, support means for supporting said turntable for rotation, means for rotating said turntable so that said projecting means moves in a generally circular path, stop means carried by said support means and extending in said path to engage said projecting means to stop said turntable after a predetermined amount of turntable rotation, means to move said stop means out of said path to permit further rotation of said turntable, and means to dampen the rotation of said turntable with respect to said support means, wherein said damping means includes a damping plate carried by said support means and spaced from said turntable, and a viscous fluid disposed between said damping plate and said turntable.

11. The combination of claim 10 wherein said turntable has a damping projection extending into a corresponding groove formed in said damping plate, said viscous fluid being disposed in said groove.

12. The combination of claim 11 wherein at least one additional damping projection is formed in said groove and is adapted to cooperate with the damping projection on said turntable to increase damping at predetermined intervals of turntable rotation.

(References on following page)

References Cited

UNITED STATES PATENTS

| | | | |
|---|---|---|---|
| 2,801,553 | 8/1957 | Reynolds | 74—819 |
| 3,048,059 | 8/1962 | Cross | 74—819 |
| 3,245,287 | 4/1966 | Nemoto et al. | 74—819 |
| 3,412,633 | 11/1968 | Huntley | 74—821 |

FRED C. MATTERN, Jr., Primary Examiner

F. D. SHOEMAKER, Assistant Examiner

U.S. Cl. X.R.

74—819, 821